United States Patent [19]

Klose et al.

[11] 4,000,320
[45] Dec. 28, 1976

[54] CHEWING GUM WITH IMPROVED STORAGE QUALITIES

[75] Inventors: Robert Edward Klose, West Nyack; Alina Surmacka Szczesniak, Mount Vernon; Bernard Joseph Bahoshy, Mahopac; Ragnar Edward Sjonvall, Eastchester, all of N.Y.

[73] Assignee: General Foods Corporation, White Plains, N.Y.

[22] Filed: Dec. 29, 1975

[21] Appl. No.: 644,701

[52] U.S. Cl. .................................. 426/3; 426/654
[51] Int. Cl.² .......................................... A23G 3/30
[58] Field of Search .................................. 426/3–6, 426/548, 654

[56] References Cited

UNITED STATES PATENTS

| 2,886,442 | 5/1959 | Kramer | 426/89 |
| 3,296,079 | 1/1967 | Griffin | 426/548 |
| 3,352,689 | 11/1967 | Bilotti | 426/3 |
| 3,655,866 | 4/1972 | Bilotti | 426/3 |
| 3,761,288 | 9/1973 | Glicksman et al. | 426/548 |

*Primary Examiner*—Jeanette M. Hunter
*Attorney, Agent, or Firm*—Richard Kornutik

[57] ABSTRACT

This invention relates to a chewing gum composition which comprises gum base, sweetener, flavor and xylitol. The xylitol is contained in the gum in amounts less than 50% by weight of the total gum composition, the xylitol being effective to extend the storage stability of the gum.

11 Claims, No Drawings

12# CHEWING GUM WITH IMPROVED STORAGE QUALITIES

BACKGROUND OF THE INVENTION

Chewing gums are generally comprised of chewing gum base such as chicle, its substitutes, mixtures thereof and the like. Incorporated within this gum base may be plasticizers or softeners to improve the consistency and texture of the gum, flavors and sweetening agents such as corn syrup or for sugarless gums, artificial sweeteners.

All commercially available gums are classified as either "sugar" or "sugarless" confections. A typical sugar gum is Wrigley's Chewing Gum manufactured by the William Wrigley, Jr., Company, Chicago, Illinois. An example of a sugarless chewing gum is Trident, manufactured by the Warner-Lambert Company, Morris Plains, New Jersey. These gums have a tendency to become brittle on storage at low relative humidities (below about 55% RH) which is the condition that prevails in many locations where gum is sold. The development of brittleness which detracts from the good chewing quality of the gum is associated with loss of moisture to the atmosphere. Chewing gum is typically manufactured and packaged in a controlled environment of about 70° F. at about 57% relative humidity. Under these conditions the gum is in equilibration with the atmosphere, that is, the gum neither gains nor loses moisture. Gum wrappers or packaging represent a substantial portion of the cost of manufacture in the processing of chewing gum. Particularly, each stick of gum is usually covered by at least three or four separate layers of wrapping or packaging material before it is put in the stream of commerce. Such packaging slows down but does not alleviate the loss of moisture unless expensive and perfect (i.e., free from pinholes, a condition which is all but impossible to achieve in practice) packaging materials are used.

It would, therefore, be highly desirable if a chewing gum composition could be devised which would not become brittle upon storage at low relative humidities.

SUMMARY OF THE INVENTION

This invention relates to a sweetened chewing gum composition which comprises gum base, sweetener and flavor to which xylitol is added in amounts less than 50% by weight of the gum composition, which xylitol is effective to extend the storage stability of the gum. Additionally, such a gum generally exhibits greater softness, flexibility and extensibility and freedom from cracking when bent compared to commercially available gums.

DETAILED DESCRIPTION OF THE INVENTION

The chewing gums of this invention comprise a gum base, sweeteners, flavors and an amount of xylitol which is less than 50% of the total gum compositon by weight which xylitol is effective to extend the storage qualities of the gum.

The gum base may be any chewable, substantially water insoluble base such as chicle and substitutes thereof, guttagkay, sorva, jelutong, synthetic polymers such as polyvinyl acetate, synthetic resins, rubbers and the like and mixtures of these materials. The amount of gum base employed may vary widely depending on the type base used and other ingredients making up the final gum product and other like factors. Generally, however, it has been found that anywhere from 15 to about 40% by weight of the final gum composition may be used and preferably from about 20 to about 30%. Plasticizers or softeners such as lanolin, propylene glycol, glycerol and the like and mixtures thereof may optionally be incorporated within the gum base to achieve a desired texture and consistency.

Generally the flavors employed in flavored chewing gums may be the essential oils or synthetic flavors or mixtures of these. Flavors such as wintergreen, spearmint, peppermint, birch, anise, fruit flavors and the like may be used satisfactorily with the variety of gum bases. The amount of flavoring material is normally a matter of preference but may be subject to the consideration of such factors as type of flavor used, and the type base used and the like. Generally, flavoring material accounts for about 1% by weight of the total gum composition.

In order to obtain a sweetened gum, the remaining portion of the gum composition is generally a sweetener such as sugar or for sugarless gums a sugar substitute. By sugar we mean sucrose, dextrose, corn syrup solids (their substitutes) and the like and mixtures thereof. Sugar substitutes may be any artificial sweetening agent used in sugarless chewing gum such as mannitol, sorbitol, saccharin, cyclamate, dipeptide sweeteners such as described in U.S. Pat. No. 3,642,491, especially L-aspartyl-L-phenylalanine methyl ester, and dihydrochalcone as described in U.S. Pat. No. 3,857,962 or mixtures of these. Additionally, an amount of sweet or nonsweet bulking agents may be included in the gum composition.

Xylitol is a pentahydric alcohol which is prepared most commonly by the hydrolysis of xylan (a common constituent of wood, corncobs and oilseed hulls) to form xylose followed by the reduction of xylose to xylitol by hydrogenation under pressure in the presence of a nickel catalyst. Xylitol appears as a crystalline compound which possesses a sweetness level of about 90% that of sucrose and xylitol is metabolized in the body to glycogen by way of the pentose-phosphate half way and is thus safely consumed by diabetics.

U.S. Pat. No. 3,899,593, issued Aug. 12, 1975, discloses sugarless chewing gum containing a major amount of xylitol, that is 50 to 80% by weight of the total gum composition is xylitol. Such a gum presents a pleasant cooling effect in the mouth. Belgium Pat. BE No. 755,115 (U.S. counterpart Pat. No. 3,914,434, issued Oct. 22, 1975) discloses the use of xylitol as a non-cariogenic sugar substitute.

It has now been surprisingly found that xylitol, when used in amounts less than 50% by weight of the total gum composition, is effective to extend the storage stability of the gum. By this we mean it enables the gum to retain more moisture when stored at low relative humidities and the gum exhibits greater softness, flexibility and freedom from cracking when bent. It is believed that the water binding properties of xylitol and/or the effect of xylitol on the crystalline structure of the gum composition are responsible for these effects.

Commercial gums are plagued by the problem of staling and the development of brittleness during storage. The growth of these undesirable qualities is accelerated during conditions of low relative humidity, i.e., below about 55%. This invention eliminates or minimizes these problems in sugar and sugarless gums. Thus, the freshness of the chewing gum can be preserved for long periods of time and/or necessity of extensive protective wrapping can be greatly reduced.

gum more extensible and more bendable and less brittle following storage at low RH's.

| | Effect of xylitol addition on flexibility of sugarless stick chewing gum | | | | | | | |
|---|---|---|---|---|---|---|---|---|
| % xylitol | 0 | | | | 5.8 | | | |
| & RH | 23 | 43 | 57 | 75 | 23 | 43 | 57 | 75 |
| Tensile testing | | | | | | | | |
| tensile yield (lbs.) | 6.1 | 5.5 | 4.7 | 1.5 | 4.8 | 3.5 | 1.9 | 0.2 |
| extensibility (mm) | 3.4 | 4.2 | 5.8 | 6.5 | 3.8 | 6.0 | 8.0 | 7.3 |
| Sensory bending | | | | | | | | |
| bending angle (°) before cracking | 63 | 61 | 5 | 0 | 15 | 0 | 0 | 0 |

The following examples and levels of xylitol are intended to be illustrative only of a few of the numerous embodiments of this discovery. Variations in the gum compositions and preparations, other sweetening systems and the like are believed ascertainable to those skilled in the art without departing from the scope and spirit of this invention.

EXAMPLE I

A commercial formula of sugar-contaning chewing gum was prepared containing different levels of xylitol substituted for part of sucrose. The resulting gum was equilibrated, without package protection, at different relative humidities for 18 days. Xylitol-containing gum lost less % moisture than the control at low RH's as exemplified by the following data:

| | 0 | 1.0 | 3.2 | % Xylitol |
|---|---|---|---|---|
| 23% RH | −0.63 | −0.60 | −0.41 | |
| 43% | −0.43 | −0.30 | −0.10 | |
| 57% | +0.20 | +0.47 | +0.90 | |
| 75% | +2.88 | +3.63 | +4.60 | |

The xylitol containing gum was also more extensible and more bendable and less brittle following storage at low RH's as shown by the data in the following table.

| | Effect of xylitol addition on flexibility of sugar containing stick chewing gum | | | | | | | | | | | |
|---|---|---|---|---|---|---|---|---|---|---|---|---|
| % xylitol | 0 | | | | 1.0 | | | | 3.2% | | | |
| % RH | 23 | 43 | 57 | 75 | 23 | 43 | 57 | 75 | 23 | 43 | 57 | 75 |
| Tensile testing | | | | | | | | | | | | |
| tensile yield (lbs.) | 7.5 | 4.6 | 1.5 | 0.4 | 4.6 | 1.5 | 0.7 | 0.2 | 3.3 | 1.5 | 0.8 | 0.3 |
| extensibility (mm) | 2.2 | 10.8 | 11.8 | 8.1 | 4.8 | 12.9 | 16.0 | 11.3 | 6.7 | 10.9 | 10.6 | 9.8 |
| Sensory bending | | | | | | | | | | | | |
| bending angle (°) before cracking | 124 | 37 | 0 | 0 | 39 | 0 | 0 | 0 | 0 | 0 | 0 | 0 |

EXAMPLE II

A commercial formula sugarless chewing gum was prepared with xylitol substituted for part of sorbitol. The xylitol-containing gum lost less % moisture than the control at low RH's as exemplified by the following data:

| | 0 | 5.8 | % xylitol |
|---|---|---|---|
| 23% RH | −3.0 | −2.4 | |
| 43 | −2.7 | −1.8 | |
| 57 | −1.9 | −0.1 | |
| 75 | +1.5 | +2.1 | |

The following shows that, similarly to the sucrose-containing gum of Example I, xylitol made the sugarless In the preceding examples an Instron Table Model TM was used with the CT Tensile Load Cell. A single stick of chewing gum, of the dimensions 73mm × 18mm × 1.6mm, was griped at both ends and stretched at the rate of 1 inch per minute. Tensile yield and extensibility were recorded. Tensile yield (lbs.) was defined as the force required to rupture the sample. It was the maximum force recorded on the tensile curve. Extensibility (mm) was defined as the distance that the sample could be stretched before rupture.

We claim:

1. In a sugar sweetened chewing gum composition which comprises gum base, flavor and sugar wherein the improvement comprises adding xylitol to the chewing gum composition in amounts less than 50% by weight of total gum composition which is effective to extend the storage stability of the gum.

2. The chewing gum composition of claim 1 wherein the amount of xylitol is less than 45% by weight of the total gum composition.

3. The chewing gum composition of claim 1 wherein the amount of xylitol is less than 40% by weight of the total gum composition.

4. The chewing gum composition of claim 1 wherein the amount of xylitol is less than 35% by weight of the total gum composition.

5. The chewing gum composition of claim 1 wherein the amount of xylitol is less than 30% by weight of the total gum composition.

6. The chewing gum composition of claim 1 wherein the amount of xylitol is less than 25% by weight of the total gum composition.

7. The chewing gum composition of claim 1 wherein the amount of xylitol is less than 20% by weight of the total gum composition.

8. The chewing gum composition of claim 1 wherein the amount of xylitol is less than 15% by weight of the total gum composition.

9. The chweing gum composition of claim 1 wherein the amount of xylitol is less than 10% by weight of the total gum composition.

10. The chewing gum composition of claim 1 wherein the amount of xylitol is less than 5% by weight of the total gum composition.

11. The chewing gum composition of claim 1 wherein the amount of xylitol is less than 1% by weight of the total gum composition.

* * * * *